May 19, 1925.  
W. J. OATES  
VARIABLE SPEED MECHANISM  
Filed May 10, 1924  
1,538,349  
2 Sheets-Sheet 1

William J. Oates, Inventor,

By E. G. Siggers, Attorney

May 19, 1925. 1,538,349
W. J. OATES
VARIABLE SPEED MECHANISM
Filed May 10, 1924 2 Sheets-Sheet 2
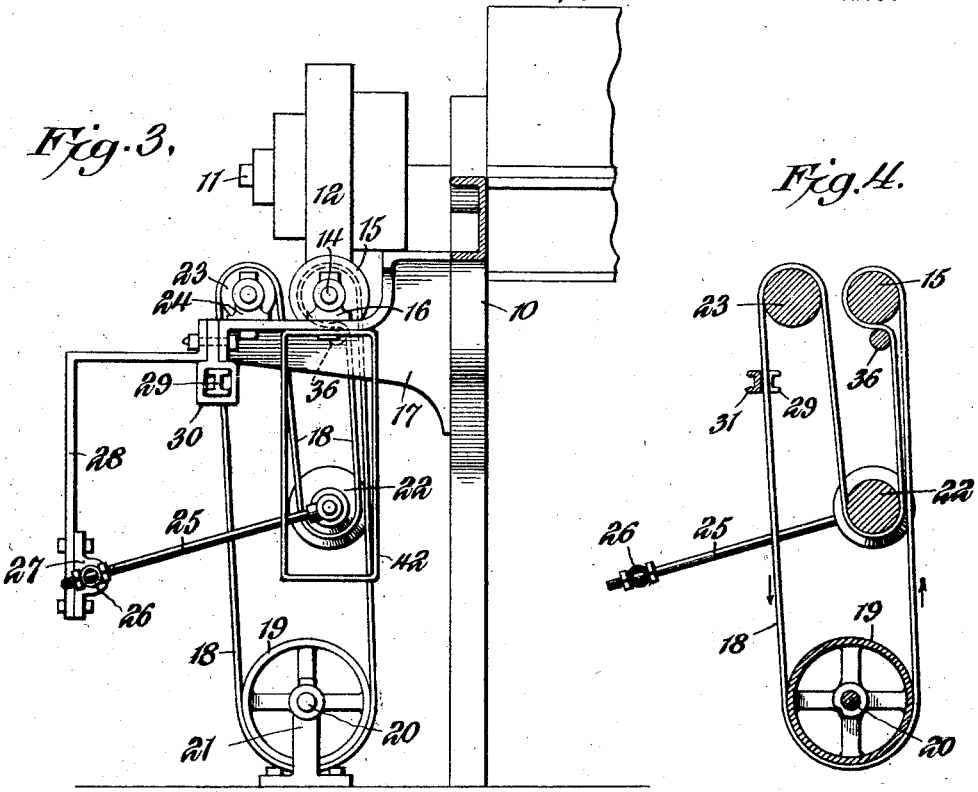
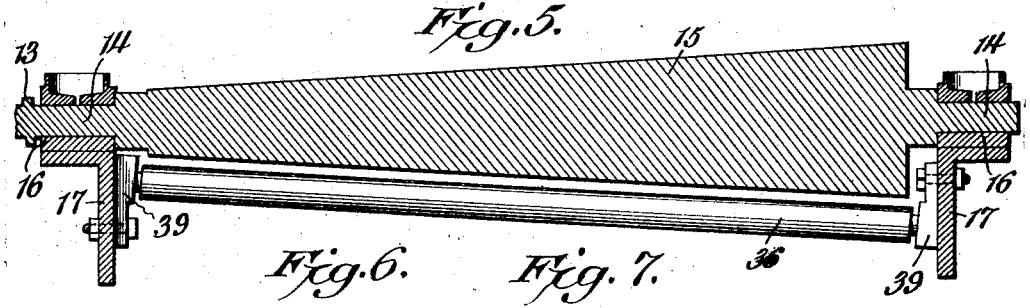
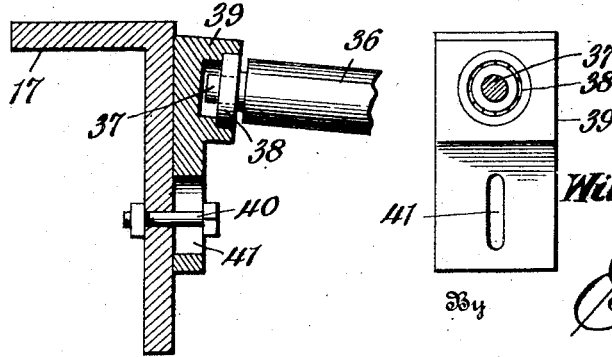
William J. Oates, Inventor,
By E. G. Siggers, Attorney Patented May 19, 1925.

1,538,349

UNITED STATES PATENT OFFICE.

WILLIAM JAMES OATES, OF GRIFFIN, GEORGIA.

VARIABLE-SPEED MECHANISM.

Application filed May 10, 1924. Serial No. 712,321.

*To all whom it may concern:*

Be it known that I, WILLIAM JAMES OATES, a citizen of the United States, residing at Griffin, in the county of Spalding and State of Georgia, have invented a new and useful Variable-Speed Mechanism, of which the following is a specification.

This invention relates to a variable speed mechanism, which is especially adapted to be used in connection with the evener motion on textile machinery of various kinds.

This class of machinery is generally driven by means of a belt, which passes over two oppositely tapered conical rolls, and which may be shifted longitudinally thereof to vary the speed.

The general object of the present invention is to provide a device adapted to be used in connection with mechanism of this character to insure a smooth, even drive, thus eliminating slippage and consequent variation in the yarn or the weave, and resulting in a more perfect and evener lap than it has heretofore been possible to produce. In its preferred form, the invention includes a gripping roll adapted to be supported underneath one of the conical rolls which is a part of the drive mechanism, in such a manner that the belt is caused to grip the conical surface of the roll throughout the greater portion of its circumference, while the other conical roll, which is an idler, has a floating support on the belt and insures a steady and even tension thereon.

For the purpose of illustration, I have shown the invention in the accompanying drawings in connection with a Kitson picker, but it will be obvious that the invention is capable of a wide variety of uses in connection with machinery where it is desirable to have a steady, even drive, the speed of which may be varied.

In the drawings:

Figure 3 is an end elevation thereof.

Figure 4 is a vertical sectional view taken transversely of the rolls.

Figure 5 is an enlarged detail sectional view taken longitudinally of the conical driving roll, illustrating the relation of the gripping roll thereto.

Figure 6 is a detail sectional view of the means for mounting the gripping roll.

Figure 7 is a side elevation thereof.

Figure 1:
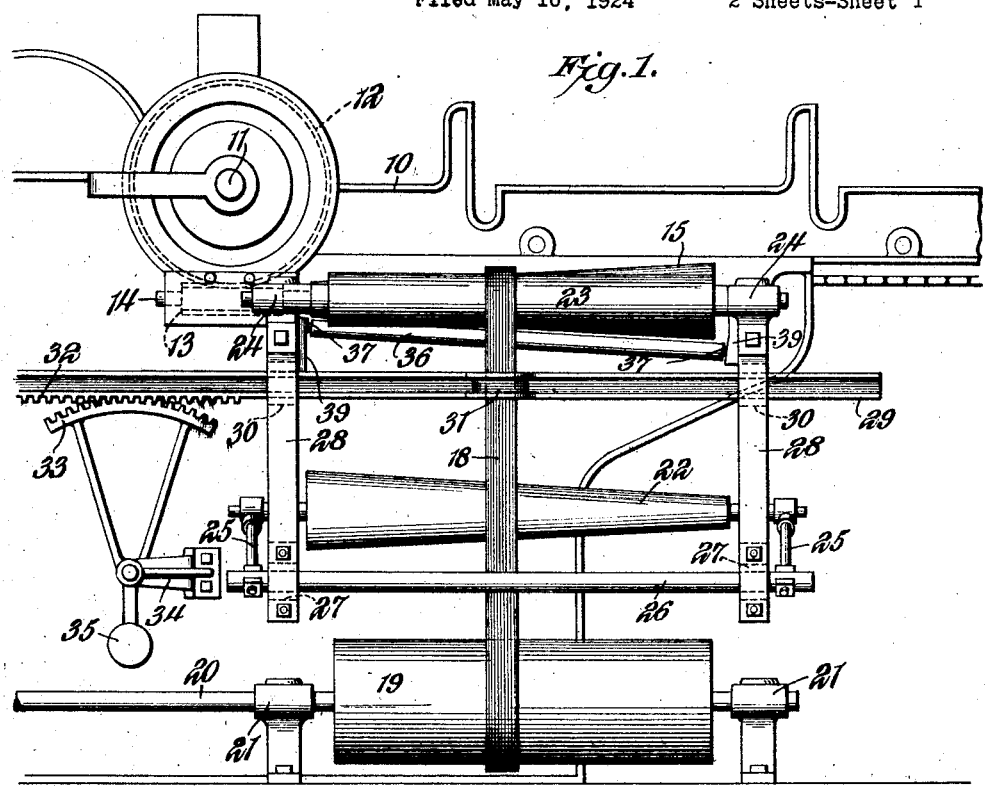
Figure 1 is a side elevation of the invention in connection with a picker, only a portion of the latter being shown.
Figure 2:
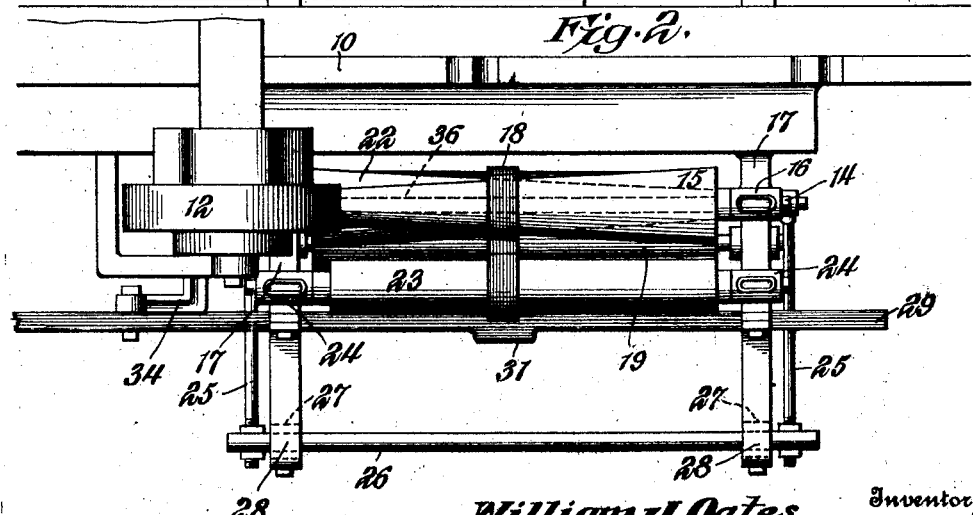
Figure 2 is a plan view thereof.

Referring in detail to the drawings, the numeral 10 indicates a portion of the frame of the Kitson picker, which, however, for the purposes of the invention may be the frame of any machine having a shaft 11, which is adapted to be driven by the mechanism which constitutes my invention. In the present instance, the shaft 11 is provided with a worm gear 12, adapted to be driven by a worm 13 formed on a shaft 14, which is an axial extension of the conical roll 15. The shaft 14 is journaled in bearing blocks 16 mounted on brackets 17, which may be conveniently supported on the frame 10 of the machine. The roll 15 is driven by an endless belt 18 from a drum 19 secured on a shaft 20, which is journaled in bearing blocks 21 supported on the floor or other suitable base adjacent the frame of the machine. The shaft 20 may be driven in any suitable manner. As best shown in Figure 4, the belt 18 passes from the driving drum 19 up over the conical driving roll 15, and then downwardly beneath an oppositely tapered conical roll 22, and then up over a cylindrical roll 23 and back to the drum 19. The roll 23 is preferably journaled in bearing blocks 24 mounted on the bracket arms 17, while the roll 22 is rotatably supported beneath the bracket arms 17 in the ends of arms 25, which are secured to and project inwardly from a rock shaft 26 mounted in blocks 27 secured to the ends of overhanging bracket arms 28, the upper ends of which are secured to the ends of the brackets 17.

The shaft 26 is mounted for free rocking movement in its bearings 27, so that the roll 22, journaled at the inner ends of the arms 25, has a floating support on the belt 18. The belt, therefore, is always held at a uniform tension, which is determined by the weight of the roll 22.

It will be understood that since the rolls 15 and 22 are tapered in opposite directions, the belt 18 is adapted to be moved longitudinally of the rolls without any material alteration in the length of its path, and such movement will vary the speed ratio between the driving roll 15 and the driving drum 19. The position of the belt 18 is determined by a bar 29, which is mounted for longitudinal sliding movement in a pair of guides 30 secured to the brackets 11, this bar 29 having a U-shaped portion 31 through which the belt passes, and by which the belt is guided. One end of the bar 29 extends beyond the bracket 17 where it is provided with a rack 32 meshing with a quadrant 33, which is rotatably supported by a bracket 34, and provided with a counterweight 35 adapted to hold the guide bar 29 and the belt 18 in the position for which it has been set.

In the mechanism above described, it will be noted that the bottom drum 19 is the driving member, and the conical roll 15 is the driven member, while the cylindrical roll 23 and the swinging conical roll 22 are idle members over which the belt passes, and which are provided only for the purpose of insuring the smooth and even movement of the belt, regardless of any change in its position, for effecting a change in the speed of rotation of the shaft 11. Special means is also provided to insure an effective gripping contact between the belt 18 and the roll 15, so as to have the same effect as if the roll 15 were positively driven. This means includes what may be termed a gripping roll 36 mounted immediately beneath and parallel to the surface of the roll 15 and supported by trunnions 37, which are mounted in ball bearings 38 carried by blocks 39 secured to the respective brackets 17. Each block 39 is preferably secured by a bolt 40 or the like, which passes through a vertical slot 41 in the block, whereby the latter may be vertically adjusted to bring the gripping roll 36 into as close proximity to the roll 15 as may be found desirable. From Figure 4, it will be noted that the gripping roll 36 is located to the right of the center of roll 15, and is separated from the roll 15 by a distance slightly more than the thickness of the belt, so that the latter contacts with the surface of the roll 15 throughout three-fourths of its circumference or more, whereby an effective grip is maintained on the roll 15, and slippage is prevented. The weight of the roll 22 maintains a suitable even tension on the belt 18, and in case the belt should break, it is desirable to provide a yoke 42 at each end thereof as a safety measure to prevent the roll from doing any damage.

The grip roll 36, as will be apparent from the foregoing description, insures for the roll 15 and shaft 11 a substantially positive drive, and this, in connection with the swinging conical roll 22, insures a uniform quality in the work produced, and consequently reduces the amount of waste and the cost of production. Inasmuch as the operation of the invention is entirely automatic, it requires less attention, and increases the capacity of the operative.

Although the invention is illustrated in connection with a portion of a picker, it also may be used in connection with carding or roving machines, or other textile machinery, and will result in yarn or cloth of uniform quality. It will also be understood that while I have shown and described specifically the construction of one form in which the invention may be embodied, this is merely illustrative and various modifications may be made in the construction of the various details and their relative arrangement without departing from the salient features of the invention as herein claimed.

What is claimed is:

1. In a device of the character described, the combination of a driving drum, a driven roll and an idle roll journaled above the drum, a swinging roll between the drum and first mentioned rolls, a gripping roll journaled beneath and proximate to the driven roll and at one side of a plane through the axes of the driven roll and the drum, and a drive belt passing directly from the drum to the driven roll on the side nearest said gripping roll, thence about the driven roll and between it and the gripping roll, whereby the belt engages the surface of the driven roll throughout the major portion of its circumference, said belt passing from the gripping roll underneath the swinging roll and constituting a floating support for the same, and passing thence over the idle roll and back to the drum.

2. In a device of the character described, the combination of a driving drum, a driven roll and an idle roll journaled above and parallel to the drum, a swinging roll between the drum and first mentioned roll, a gripping roll journaled beneath and proximate to the driven roll and at one side of a plane through the axes of the driven roll and the drum, means for adjusting the gripping roll to vary the distance between its surface and the surface of the driven roll, and a drive belt passing directly from the drum to the driven roll on the side nearest said gripping roll, thence about the driven roll and between it and the gripping roll, whereby the belt engages the surface of the driven roll throughout the major portion of its circumference, said belt passing from the gripping roll underneath the swinging roll and forming a floating support therefor, and passing thence over the idle roll and back to the drum.

3. In a changeable speed mechanism, the combination of a driving drum, brackets located above the drum, a driven roll and an idle roll journaled on said brackets, a swinging roll between the drum and first mentioned rolls, a shaft mounted for free rocking movement and having laterally projecting arms in which the swinging roll is journaled, a gripping roll journaled beneath and proximate to the driven roll and at one side of a plane through the axes of the driven roll and the drum, and a drive belt passing directly from the drum to the driven roll about the latter and between it and the gripping roll, whereby the belt engages the surface of the driven roll throughout the major portion of its circumference, said belt passing from the gripping roll underneath and in supporting relation to the swinging roll, thence over the idle roll and back to the drum.

4. In a changeable speed mechanism, the combination of a driving drum, brackets located above the drum, a driven tapered roll and an idle roll journaled on said brackets, a swinging oppositely tapered conical roll between the drum and first mentioned rolls, a shaft mounted for free rocking movement and having laterally projecting arms in which the swinging roll is journaled, a gripping roll journaled in bearings beneath and proximate to the driven roll with its axis parallel to the surface thereof, means for adjusting said bearings to vary the distance between the gripping roll and the surface of the driven roll, said gripping roll being located at one side of a plane through the axes of the driven roll and the drum, and a drive belt passing directly from the drum to the driven roll, about the latter and between it and the gripping roll, whereby the belt engages the surface of the driven roll throughout the major portion of its circumference, said belt passing from the gripping roll underneath and in supporting relation to the swinging roll, thence over the idle roll and back to the drum.

5. In a changeable speed mechanism, the combination of a driving drum, brackets located above the drum, a driven tapered roll and an idle roll journaled on said bracket, a swinging oppositely tapered roll between the drum and the first mentioned rolls, a shaft mounted for free rocking movement and having laterally projecting arms in which the swinging roll is journaled, a gripping roll journaled beneath and proximate to the driven roll with its axis parallel to the surface thereof, said gripping roll being located at one side of a plane through the axes of the driven roll and the drum, a drive belt passing directly from the drum to the driven roll, about the latter and between it and the gripping roll, whereby the belt engages the surface of the driven roll throughout the major portion of its circumference, said belt passing from the gripping roll underneath and in supporting relation to the swinging roll, thence over the idle roll and back to the drum, a slidable rack bar mounted parallel to said rolls and having means for guiding the belt, and a weighted gear segment meshing with said rack bar for determining the position of the belt longitudinally of said rolls, and consequently the relative speed of the driven roll.

In testimony that I claim the foregoing as my own, I have hereto affixed my signature.

WILLIAM JAMES OATES.